United States Patent [19]
Hill et al.

[11] Patent Number: 5,282,178
[45] Date of Patent: Jan. 25, 1994

[54] METHOD AND APPARATUS FOR ATTRACTING FISH TO A SELECTED LOCATION

[75] Inventors: Kenyon G. Hill; Loren G. Hill, both of Norman, Okla.

[73] Assignee: Concepts Research, Inc., Norman, Okla.

[21] Appl. No.: 976,966

[22] Filed: Nov. 16, 1992

[51] Int. Cl.[5] ..................... A01K 79/02; H04R 23/00
[52] U.S. Cl. .................... 367/141; 367/191; 43/17.1
[58] Field of Search .................. 43/17.1; 367/141, 191

[56] References Cited

U.S. PATENT DOCUMENTS

| | | | |
|---|---|---|---|
| 3,885,338 | 5/1975 | York | 43/17.1 |
| 4,471,552 | 9/1984 | McIntosh et al. | 43/17.1 |
| 4,646,276 | 2/1987 | Kowalewski et al. | 43/17.1 |
| 4,932,007 | 6/1990 | Suomala | 43/17.1 |
| 4,955,005 | 9/1990 | Loeffelman | 43/17.1 |
| 5,046,278 | 9/1991 | Szilagyi et al. | 43/17.1 |
| 5,117,572 | 6/1992 | Parra | 43/17.1 |

*Primary Examiner*—J. Woodrow Eldred
*Attorney, Agent, or Firm*—Dougherty, Hessin, Beavers & Gilbert

[57] ABSTRACT

Methods and apparatus for sonically attracting bass fish to a desired location which entails propagating a sound into water constituting a habitat for fish, the propagated sound being an emulation of the sound made by a bass fish striking and eating a live bait species. In one embodiment of the invention, the propagated sound is originated at the location to which the fish are to be attracted by first recording the sound of bass fish striking and then consuming a live bait species at an underwater situs, and then propagating the recorded sound from a selected location.

13 Claims, 1 Drawing Sheet

METHOD AND APPARATUS FOR ATTRACTING FISH TO A SELECTED LOCATION

FIELD OF THE INVENTION

This invention relates to fishing methods and apparatus, and particularly, to methods and apparatus for sonically attracting fish to a selected location for purposes of observing or feeding or catching the fish.

BACKGROUND OF THE INVENTION

Brief Description of the Prior Art

It is known that many types of aquatic animals, such as whales, porpoises and frogs produce sounds for social communication involving the functions of reproduction, mate selection, territoriality and defense, among others. Fishermen have used this fact to attract and catch fish by using fishing lures which click or pop or rattle.

Sound is often of significant and particular value under aquatic environmental conditions unsuitable for visual or olfactory chemical communication. For example, the effectiveness of visual stimuli in an underwater location is frequently limited by low light levels, or heavy suspensions of colloidal material or mud particles or the like which severely attenuate the intensity of the light signal over distance. Chemical signals involving the olfactory sense of the fish propagate slowly, are non-directional and are easily diffused by water currents. Even so, in some instances, such as the use of putrefied liver and blood baits for the catching of catfish, the olfactory sense has been useful in the attraction of fish.

When contrasted with the senses of sight and smell, sound, when used in water, has a high speed of propagation, a low rate of attenuation and has directional properties which permit it to be transmitted from a given location in the water outwardly in a given or selected direction. Consequently, sound is valuable for rapid, high speed communication over a considerable distance. There is general familiarity, of course, With the use of acoustic signals in submarine warfare situations, where hydrophones carried by one vessel are used to pick up the sound generated by the screws of another vessel, as such sounds are transmitted through the water to the receiving ship.

Sound is perhaps the most important source of information to fish about the environment around them, because in contrast to the relatively poor properties of water as a transmitter of light, sound is transmitted through water very efficiently. In comparison with air, water is much denser and much less elastic. It thus transmits sound at a velocity which is about 4.8 times its velocity through air, and the attenuation of sound over distance in water is much less than the attenuation of light. As indicated earlier, it has been recognized for a number of years, that depending upon the acoustic properties of the signals, including the frequency and transient characteristics, certain types of sound such as pops, clicks and rattles can be used to effectively attract fish to the location of the sound source.

Sound detection in fishes involves both the inner ear and the acoustico lateralis systems. The inner ear consist of three, semi-circular canals and three otolithic organs, the utriculus, the sacculus and the lagena. The utriculus is essentially a vestibular organ, along with the semi-circular canals, while the sacculus and the lagena are involved with audition. The lateral lines along the sides of the body of the fish include neuromasts which are composed of air cells, sensory cells and cupula, and such lateral lines are sound sensitive.

BRIEF DESCRIPTION OF THE PRESENT INVENTION

A unique and highly effective technique for attracting fish to a desired location has been developed. As a result of such attraction to, and congregation of fish in, that location, they may be observed, treated, fed or caught as may be desired. The method for attracting fish to a given location involves the use of certain specific frequency sonic emulations, and more specifically, the propagation of such sound outwardly in the water from the location to which the fish are to be attracted to parts of the body of water constituting a known habitat for fish. The preferred sound employed is that of a largemouth bass, scientific name *Micropterus salmoides*, striking and consuming a small natural bait species, such as a minnow or shad. I have further found that the propagation of this sound also has a marked tendency to make fish who hear it more aggressive toward any small bait fish in the vicinity.

In a specific embodiment of the invention, the sound which is thus propagated for the purpose of attracting the fish to the desired location from which the sound is transmitted or emitted, is sound generated by initially recording, by means of a hydrophone, the sounds of largemouth bass fish (one or more) actually striking and consuming a small bait fish located in the water near the hydrophone. As the bass strikes and consumes the minnow or shad, the sounds of the strike and the sounds of the bait being ingested through the gullet of the striking fish are recorded by means of the hydrophone. These sounds are then subsequently reproduced at a location in the water where it is desired to attract fish, and particularly bass, for a purpose served by having such attracted fish very close to the point from which the sound is originated.

An important object of the present invention is to provide an improved method for motivating fish to swim to a selected location within a body of water in which the attracted fish are at large and normally live.

A further object of the invention is to provide a method by which fish can be attracted for purposes of bringing them to a point of observation, or to a location which will enable them to be more effectively fed so as to more rapidly grow to a larger size.

Another object of the invention is to provide a method by which the natural sounds made by certain game fish in the process of feeding can be reproduced and propagated through the water in a way which causes other such fish of the same species to be attracted by the sound, and to swim to the location from which it originates.

Additional objects and advantages of the invention will become apparent as the following detailed description of the invention is read in conjunction with the accompany drawings which illustrate certain aspects of the invention.

GENERAL DESCRIPTION OF THE DRAWINGS

DETAILED DESCRIPTION OF A PREFERRED EMBODIMENT OF THE INVENTION

Figure 1:
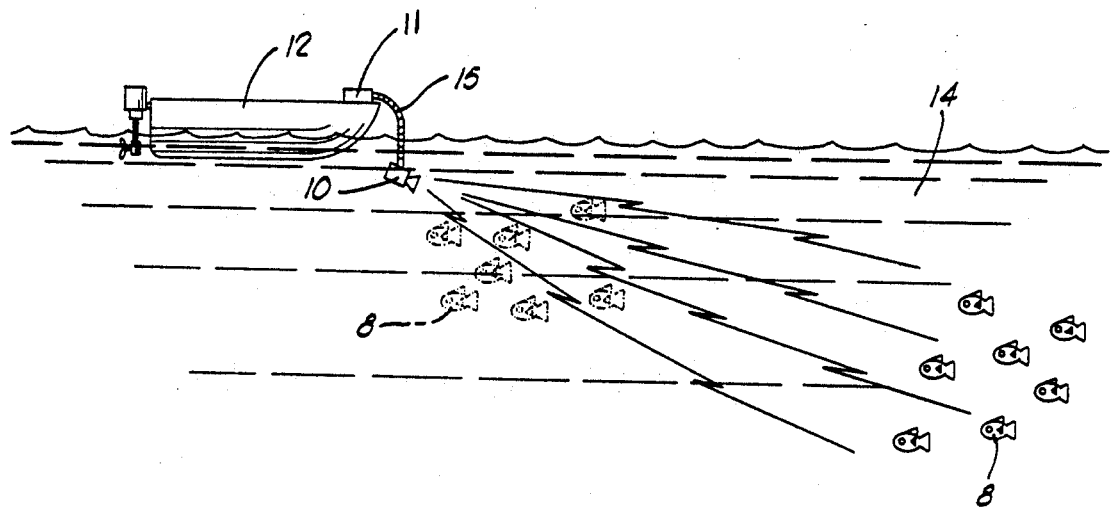
FIG. 1 illustrates one embodiment of the method of the invention in which fish are attracted to a selected location for purposes of observation, treatment, feeding or catching.

In carrying out the method of the invention, a sound transducer or emitter, such as a loud speaker or amplifier 10, is used to propagate sound into the water when it is placed at a desired location to which it is desired to attract fish 8 and cause them to move from remote locations in the body of water into which the sound is transmitted. As shown in FIG. 1 of the drawings, this location may be a boat 12 having the sound transducer 10 affixed to or supported from the boat, and positioned to cause the sound to enter the water 14 and be projected in a selected direction from the point of origination.

For example, in the course of fishing, it may be thought best to direct the sound from the boat outwardly into the main body of the lake from a boat which, at the time of the sound origination, is located along the shoreline or in a cove of the lake. In other instances, it may be thought desirable to propagate the sound from the boat in toward a protected cove or inlet past which the boat is slowly moving in order to attract fish from cover out toward the boat. In other instances, it may be desired to direct the sound omni-directionally.

Various types of sound producing devices can be used to originate the propagated sound, but in the case of the preferred embodiment of the present invention, the sound producing transmitter must be capable of producing the sound of a large-mouth bass, scientific name *Micropterus salmoides*, which is in the process of striking and then consuming a small live bait species, such as a minnow or small shad. It has been determined that the use of this particular sound is important to most effectively attract bass and other fresh water species. More generally, the preferred sound can be described as the sound of a feeding predator fish.

In a preferred embodiment of the invention, the method of attracting fish to a selected location further includes the initial step of preliminarily preparing a recording of the sound of feeding bass. This is accomplished by placing a hydrophone at a selected location where bass are feeding on minnows or shad, and recording the sound of the bass striking the bait, and then ingesting it through the grinding mandibles which are in the throat of the bass. It has been determined from experiments that these sounds are repeatable, and are characteristic of bass in the process of feeding, and it has further been determined that this is the sound which needs to be emulated in the production of sound originated at the location to which the bass are to be attracted. Of course, other methods can be used, such as making a recording of previously recorded appropriate sounds of feeding bass to be played from the transmitter, after amplification, with the propagation originating at the location to which the bass are to be attracted.

One embodiment of the present invention is illustrated in the two figures of the drawing. In FIG. 1 of the drawings, the method of sensitizing and attracting the bass 8 is shown. In this instance, a sound producing device 11 is located on a boat 12. The device 11 includes a recording, a playback means, and an amplifier. It may be a tape recording and tape player. The loud speaker or sound transmitter 10 may be mounted in the bottom of the boat or on the stern or on the bow thereof, and directs the sound into the water 14 for propagation through the water in a selected direction. If a directional transmitter 10 is used, it preferably is mounted on a swivel 15 structure so that it can be made selectively directional according to the location in the fish inhabited body of water where it is believed that the fish are most likely to be located at that time. If an omni-directional transmitter 10 is used, the swivel device is unnecessary.

As previously explained, the sound which is transmitted in this manner is that made by a bass fish at the time the fish strikes a small bait fish, and then ingests the bait. In FIG. 1, the location of the fish 8 when the sound is first transmitted is shown in full lines. The fish which have been attracted by the sound are shown in dashed lines. The bass fish who are in the line of transmission or propagation of the described sound have been found to have a heightened aggressive tendency. One of the reasons bass strike at bait fish, as well as become aggressive toward intruders in a nesting area or the like, is the heightening of aggressive instincts in the bass. It has been found that the propagation of the described sound of bass feeding tends to aggravate the bass, and cause an enhancement of aggressive instincts so that the bass is more apt to strike at any bait species in the vicinity of the bass so sensitized, or, stated differently, within striking distance.

Figure 2:
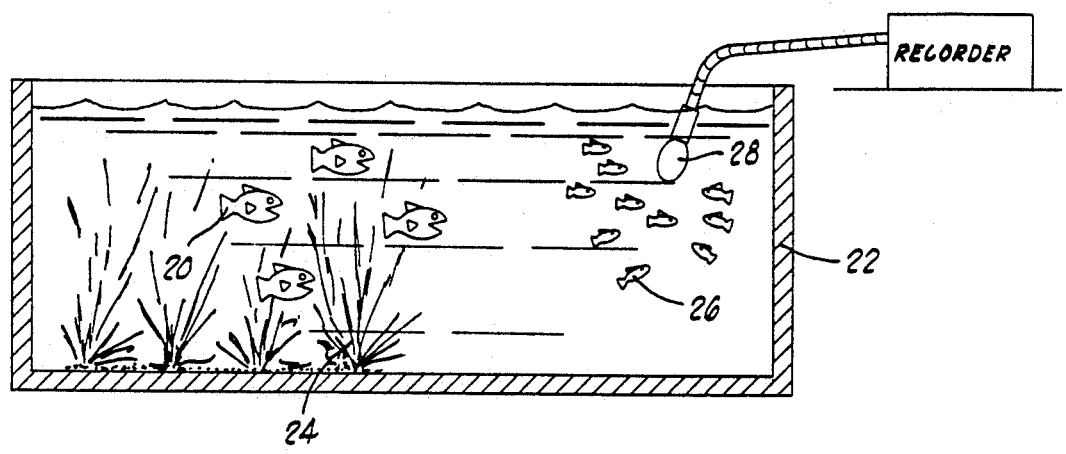
FIG. 2 shows one preferred method by which the sound of feeding bass fish is captured and recorded for subsequent reproduction in the course of carrying out the method of the present invention.

In FIG. 2 of the drawings, a preferred method of preparing a recording to be used to produce the sound which is transmitted from the boat (as shown in FIG. 1) is illustrated. Here, bass fish 20 are shown in a 5,000 gallon tank 22 in which they are held captive. Brush 24 was placed in the tank to establish habitat. A filtering system (not shown) was provided to maintain water quality. Numerous largemouth bass, *Micropterus salmoides*, were captured and released into this tank over a two year duration. The bass 20 placed within the tank were conditioned and trained to approach the researcher-observer, and to position themselves directly in front of the researcher in the tank, and to remain there for a short time without significant movement. The filtering system of the tank was disconnected so that no sounds were being produced within the experimental tank 22 at this time.

Once the bass had been trained to approach the researcher-observer in the manner described, the unique sounds used in the practice of the method of the present invention were recorded. These unique sounds were the sounds of the bass feeding on small minnows 26 placed adjacent the trained fish in the tank, and were the sounds of the bass striking and ingesting the minnows. The underwater sounds were detected by means of a hydrophone 28 —an underwater microphone which converts the water-borne sounds into electrical signals which can be subsequently amplified, analyzed or rebroadcast into air or water. The hydrophone 28 employed was sensitive to sound pressure; the pressure-sensitive element was composed of a waterproof electrostrictive transducer of barium titanate connected to a high input impedance amplifier.

After the described feeding sound has been recorded, it is available for use in transmitting the same sound in a body of water constituting a game fish habitat, so as to attract such fish to the location of the sound source as shown in FIG. 1. At this location, the fish may be observed for study, or they may be fed, such as in the case of fish farms Where the objective is to increase the size of the fish, or they may be game fish which a fisherman seeks to catch when they have been attracted to the location near the boat. The waiting fisherman is there prepared to offer his baited hook to the fish approaching in response to the sound stimuli.

The effectiveness of the present invention is shown by the following examples.

EXAMPLE NO. 1

The preferred pre-recorded sound described above was propagated by transmitting sound developed by playing a recording. A first person was in the boat 12 and placed the sound-producer transmitter three inches under the surface of the water. A second person who was a certified scuba diver observed and recorded the number and type of fish species seen. Regardless of the depth of water, whether seven feet deep, fifteen feet deep, or twenty feet deep, he would position himself on the substrate/bottom of the lake. However, because of poor light penetration and the presence of the colloidal suspension of clay (turbidity), the scuba diver's vision was limited to only 2.5 feet in distance at all site locations. Three different sites were selected: one within a total depth of seven feet of water, another at fifteen feet of water, and the last site was in twenty feet of water. Once the site was selected, the scuba diver would penetrate into the water and go to the bottom. Once he was positioned at the bottom, he was allowed ten minutes to observe and record the number of fish he saw—even though he could not see beyond a distance of 2.5 feet. During the ten minute period, the person in the boat did not produce a sound by playing the recording. During each of the three experiments (seven feet, fifteen feet and twenty feet), the scuba diver did not observe or record the presence of a single fish during the first ten minutes when no sounds were produced by playing the recordings. However, when the person in the boat subsequently started producing the natural sound of the bass striking minnows and the bait fish being ingested through the gullet of the bass, the results were successful to a surprising and unexpected degree. During the ten minute duration of the scuba diver sitting on the bottom, the person in the boat would observe the bubbles coming to the surface from the scuba diver's oxygen machine. In that manner, the person in the boat knew exactly where the scuba diver was positioned. Each time, whether the scuba diver was at seven feet, fifteen feet or twenty feet, the person in the boat would move within six feet of where the bubbles were coming to the surface and produce the preferred sounds by playing the recordings. The results of these tests were as follows.

Run No. 1

Conducted on an inland reservoir (Lake Texoma, located on the Oklahoma/Texas border). Reservoir conditions at the test site were:
(1) depth—seven feet;
(2) limited visibility by scuba diver to distance of 2.5 feet;
(3) time of day—mid-afternoon;
(4) weather conditions—partly cloudy.

In the first ten minutes of observation without producing sounds no (0) fish were observed by scuba diver. Within sixty seconds after beginning sound transmission, fish appeared and during the next five minutes sounds were produced and the scuba diver recorded: 16 bass (15 largemouth bass and 1 spotted bass); and 14 sunfish (12 bluegill sunfish and 2 longear sunfish).

Run No. 2

Conducted on same reservoir under following conditions:
(1) depth—fifteen feet;
(2) 2.5 foot visibility by the scuba diver;
(3) time of day—mid-afternoon;
(4) weather conditions—partly cloudy.

In the first ten minutes of observation without producing sounds no (0) fish were observed by scuba diver. Within sixty seconds after beginning sound transmission, fish appeared and during the next six minutes sounds were produced and the scuba diver recorded: 22 bass (19 largemouth bass, 2 spotted bass and 1 smallmouth bass); and 30 sunfish (22 bluegill sunfish and 8 longear sunfish).

Run No. 3

Conducted on the same reservoir under the following conditions:
(1) depth—twenty feet;
(2) scuba diver visibility limited to 2.5 feet in distance;
(3) time of day—late-mid-afternoon (5:00 p. m.);
(4) weather conditions—partly cloudy.

In the first ten minutes of observation without producing sounds no (0) fish were observed by scuba diver. Within sixty seconds after beginning sound transmission, fish appeared and during the next seven minutes sounds were produced and the scuba diver recorded: 26 bass 22 largemouth bass and 4 spotted bass); and 31 sunfish (27 bluegill sunfish and 4 longear sunfish).

During these experiments, the scuba diver observed the bass to be extremely aggressive and on two occasions, bass started fighting by biting each other. Also, in one instance, a bass approached the scuba diver and bit the man on the arm—a first-time-ever event to the scuba diver.

EXAMPLE NO. 2

The preferred recorded sounds have also been presented to fish in a controlled experimental tank where seven (7) conditioned largemouth bass were held. The observer placed himself behind a camouflaged sheet so the fish were not aware of his presence. Through a tiny hole, the observer could see a part of the tank. Every time the observer played the prerecorded sound of feeding bass, the bass in the tank became extremely active, swimming fast around the tank and frequently getting into a fight.

Although a preferred embodiment of the present invention has been herein described in order to provide the needed guidelines to enable those skilled in the art to practice the invention, some changes in the methodology may be effected without departure from these basic guidelines. Thus, the source of sound which is propagated outwardly into the waters of the fish habitat may be located at a dock or other stationary structure along the shoreline, rather than a boat. Various other changes can be made without departure from the basic principles of the invention. All such changes are therefore deemed to be circumscribed except as the same may be necessarily limited by the appended claims or reasonable equivalents thereof.

What is claimed is:

1. A method of sonically attracting bass fish to a desired location comprising propagating a sound from that location outwardly into a body of fresh water constituting a bass fish habitat, said sound being propagated by playing a recording of the sound of a bass fish striking and eating a smaller live bait fish.

2. The method defined in claim 1 wherein said desired location is a boat.

3. The method defined in claim 1 and further characterized as including the steps of:
pre-preparing such propagated sounds by first recording the sound of said bass fish striking, and then consuming, said smaller live bait fish at an underwater situs.

4. The method defined in claim 3 wherein the pre-preparing of said sound is accomplished by:
training and conditioning confined fish to approach a location in a training tank where one or more of said smaller live bait fish are located and a hydrophone is also located; then
receiving and picking up with the hydrophone, and then recording, the sound of the trained confined fish striking and then consuming, one or more of said smaller live bait fish.

5. The method of claim 1 wherein said bass fish is a *Micropterus salmoides*.

6. The method of claim 1 wherein said sound is propagated primarily along a selected directional path by placing a directional transmitter in the water and orienting said directional transmitter along said path.

7. The method of claim 1 wherein said sound is propagated substantially omni-directionally from said location.

8. A fish attracting apparatus comprising:
an underwater sound transmitter;
a recording of a *Micropterus salmoides* striking and consuming a live bait fish; and
playback means for transmitting said recording through said transmitter.

9. The apparatus of claim 8 further comprising:
said transmitter being a directional transmitter; and
directional mounting means for supporting said transmitter from a boat and for allowing said transmitter to be oriented to direct sound on a selected direction through a body of water upon which said boat is floating.

10. The apparatus of claim 8 wherein:
said transmitter is an omni-directional transmitter.

11. The apparatus of claim 8, wherein:
said recording includes a sound of said *Micropterus salmoides* ingesting said live bait fish through the gullet of the *Micropterus salmoides*.

12. The apparatus of claim 8, wherein:
said recording includes a sound of said *Micropterus salmoides* ingesting said live bait fish through the grinding mandibles in the throat of the *Micropterus salmoides*.

13. A method of preparing a recording for later playback as an attractor for *Micropterus salmoides*, comprising:
confining and training one or more *Micropterus salmoides* to approach a location in a training tank where one or more live bait fish are located and a hydrophone is also located; and
receiving with said hydrophone a sound of said confined and trained *Micropterus salmoides* striking and then consuming one or more of said live bait fish; and
recording said sound received with said hydrophone.

* * * * *